Oct. 12, 1948.          G. J. MAXSON          2,450,975
                METHOD OF PRODUCING A NITROGEN ATMOSPHERE
                          Filed Jan. 10, 1942
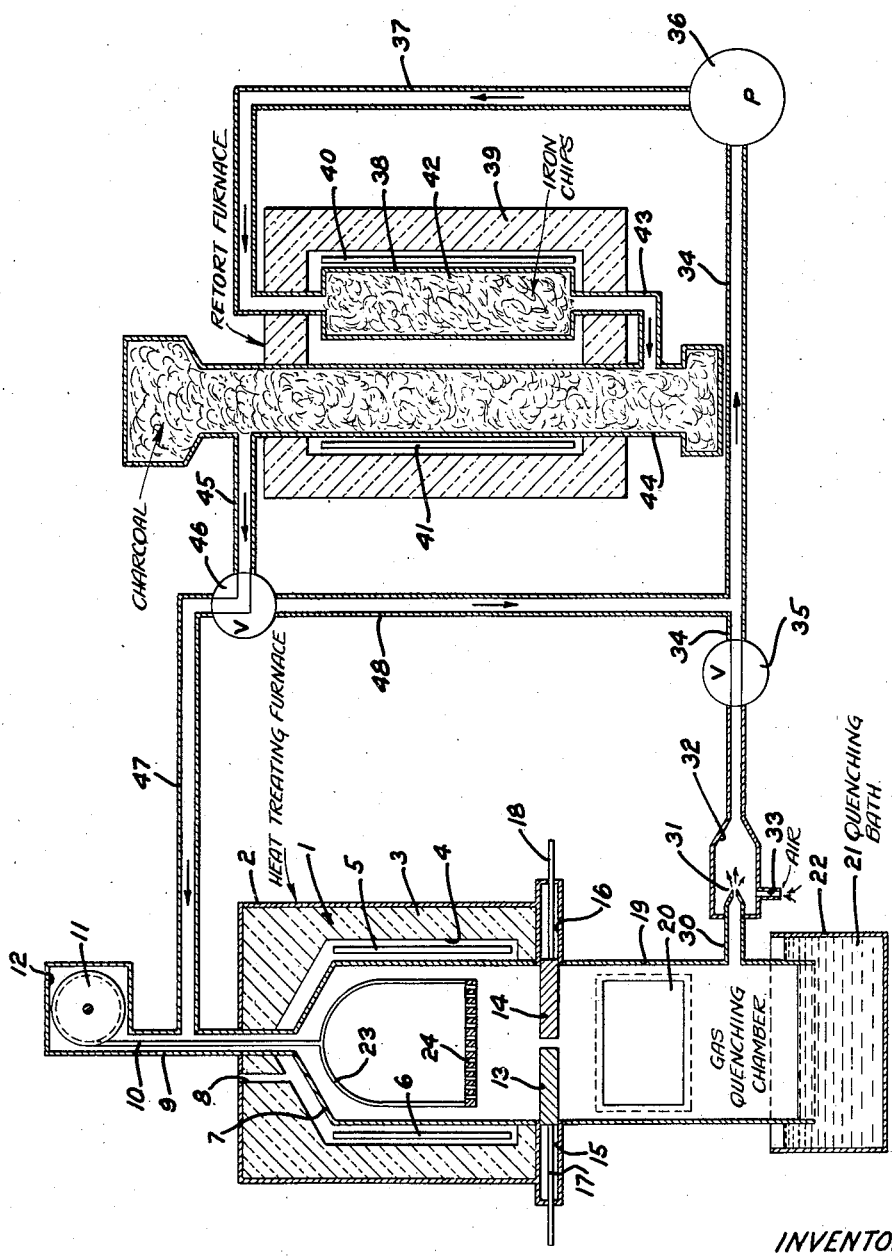
INVENTOR
G. J. MAXSON
BY Harry L. Duft
ATTORNEY Patented Oct. 12, 1948

2,450,975

UNITED STATES PATENT OFFICE 2,450,975

METHOD OF PRODUCING A NITROGEN ATMOSPHERE

Gordon J. Maxson, Western Springs, Ill., assignor to Western Electric Company, Incorporated, New York, N. Y., a corporation of New York Application January 10, 1942, Serial No. 426,367

4 Claims. (Cl. 23—2)

This invention relates to a nitrogen segregator and a method of segregating nitrogen and more particularly to a recirculating and self-reactivating nitrogen segregator for use in producing nitrogen to supply a heat treating furnace.

It is an object of the present invention to provide a simple and efficient method of and apparatus for producing relatively pure nitrogen gas.

In accordance with one embodiment of the invention, a charcoal filled retort and a retort filled with iron chips are heated and are connected by means of suitable piping to a heat treating furnace in such a manner that the air contained in the furnace is withdrawn therefrom, forced first through the retort filled with iron chips, through the charcoal filled retort, then through the furnace and recirculated back through the retorts. In passing initially through the heated retort filled with iron chips, the air is freed of its oxygen and in passing next through the heated charcoal retort, the $H_2O$ is removed, producing relatively pure nitrogen containing small amounts of hydrogen $H_2$ and carbon monoxide $CO$, which is suitable for use in a heat treating furnace through which the thus produced gas is then passed and circulated back to the retort filled with iron chips and recirculated through the system. As the gas containing nitrogen, $H_2$ and $CO$ passes through the retort filled with iron chips after being used in the furnace, the iron will be partially reduced and the relatively pure nitrogen will be recirculated.

Complete reduction of the iron in the retort can be effected by manipulating valves in the piping, whereby the gas will not be passed through the furnace, but simply circulated through the retorts until the iron has been reduced by the $H_2$ and $CO$ in the nitrogen gas. Suitable means is provided for admitting air to the gas being passed from the furnace to the retort containing the iron chips to replace any gas lost in the system by consumption of oxygen and losses due to leaks.

A better understanding of the invention may be had by reference to the following detailed description when considered in conjunction with the accompanying drawing, wherein the single view illustrates, diagrammatically, one embodiment of the invention.

In the drawing, there is shown a furnace 1, in which metals may be hardened in a nitrogen atmosphere. The furnace 1, which is shown in detail and claimed in the co-pending application of G. J. Maxson, Serial No. 426,369, filed January 10, 1942, now Patent No. 2,413,987, comprises a casing 2 enclosing a body of insulating material 3, which is provided with an interior chamber 4 for receiving heating elements 5 and 6. The heating elements 5 and 6 are positioned between the insulating material 3 and a gas tight shell 7, which conforms generally to the shape of the chamber 4. The shell 2 and body of insulating material 3 have a passage 8 extending through them through which a protective gas may be passed to the heating elements 5 and 6. At its upper end, the shell 7 terminates in a gas tight tube 9, through which an elevator rod 10 may move freely. The elevator rod 10 is adapted to be driven by a sheave 11, which may, in turn, be driven in any suitable manner, the sheave being positioned in an enlarged portion of the tube 9, which forms a gas-tight chamber 12. The lower end of the shell 7 is almost completely closed by a pair of gates 13 and 14, which are slidable in guide passages 15 and 16, respectively, and are spaced to permit gas forced into the top of the shell 7 to pass out of the heating space. The gates 13 and 14 may be manipulated by means of rods 17 and 18, respectively, which extend into the guide passages 15 and 16. Communicating with the shell 7 and abutting the underside of the guide passages 15 and 16 is a downwardly extending chamber 19, provided with a suitable gas tight charging door 20. The chamber 19 extends downwardly into a bath 21 of quenching fluid maintained in a container 22.

Fixed to the rod 10, is a bail 23, carrying a work-supporting platform 24, upon which the metals to be treated may be placed when the rod 10 is moved downwardly to carry the platform 24 just below the level of the charging door 20.

Extending from the chamber 19 and in communication therewith is a pipe 30, which terminates in a pressure maintaining orifice 31 within a chamber 32, which, in turn, has an air entrance port 33 in communication therewith. The right end of the chamber 32 is in communication with a pipe 34, in which there is positioned a cut-off valve 35. The pipe 34 extends to a recirculating pump 36 and when the apparatus is in operation, the pump 36 will draw any gas which had been in the furnace, and air to supplant gas lost by leakage from the furnace, and force this mixture upwardly through a pipe 37 to a retort 38, which is positioned in a retort heating furnace 39. The furnace 39 is heated by means of heating elements 40 and 41 and will heat the iron chips 42 in the retort 38. As the gases are directed under pressure through the retort 38, they will pass out through a pipe 43 to a retort 44, which, at the beginning of the operation of the apparatus, is filled with charcoal and which has a major portion of its body within the furnace 39. The pipe 43 enters the lower end of the retort 44 and will direct the gas upwardly through the retort and out through a pipe 45 to a three-way valve 46, which, in the position shown, will direct the gas from pipe 45, through a pipe 47, into the tube 9, and thence to the interior of the shell 7, where the work is held during the heat treatment thereof. The valve 46, in its other operative position, will direct the gases from pipe 45 downwardly through a pipe 48 and into the pipe 34, which, if the valve 35 is closed, can conduct the gases only to the pump 36 for reactivation of the iron retort.

In the operation of the apparatus, the furnace 1 may be heated, by means of the heating elements 5 and 6, to raise the temperature in the furnace to the desired temperature either before or after a load of work has been placed on the platform 24 and the gates 13 and 14 moved to the position shown. When the heating elements 40 and 41 have heated the iron chips in the retort 38 and the charcoal in retort 44 to a temperature at which the iron will readily combine with the oxygen in the air drawn from the furnace, the pump 36 may be started and with the valves 35 and 46 in the position shown, the air or other gases inside the shell 7 and chamber 19 will be forced through the orifice 31 and drawn together with air which will supplant the gases lost through leakage in the various parts of the system through the pump and the gas mixed with air (or air if the apparatus is just being started in operation) will be forced through the retort 38 containing the iron chips or filings. In passing through the iron chips in the retort 38, oxygen in the air will unite with the heated iron chips to form an iron oxide and the resultant gas being passed into the pipe 43 will be freed of its water when passed through the hot charcoal in the retort 44 by conversion to $H_2$ and CO. The resultant gas will comprise nitrogen containing small amounts of $H_2$ and CO. This gas will then be directed through the pipe 45, valve 46 and pipe 47 into the tube 9 and thence to the inner chamber formed by the shell 7 under pressure since the orifice 31 will restrict the passage of the gas back into the chamber 32. This will result in the liquid 21 in the quenching tank 22 being lower, as shown, within the chamber 19 than outside of it. In this manner, relatively pure nitrogen will be supplied under pressure to the heat treating furnace to provide the desirable heat treating atmosphere during the treating of the material on the platform 24. After the heat treatment has been completed, the gates 13 and 14 may be opened to permit the passage of the work into the chamber 19, where it may be quenched in a nitrogen atmosphere or in the quenching bath, which may be of any suitable material.

Since the passage of gas from the furnace back to the pump is restricted at the orifice 31, there will be a definite gas pressure within the furnace resulting in some leakage and air will be drawn into the chamber 32 through the inlet port 33 to compensate for the gas thus lost. As the nitrogen with hydrogen and carbon monoxide in it is again drawn from the pipe 34 by the pump 36 and passed into the retort 38, the iron in the retort will be partially reduced and the relatively pure nitrogen may be recirculated through the system. If it is desired to completely reduce the oxidized iron chips in the retort 38, this may be accomplished by shifting the valves 35 and 46 to the position opposite to that shown where the furnace will be completely cut off from the nitrogen generating portion of the apparatus and the gas may be circulated from the pump through the retorts 38 and 44, pipe 45, valve 46, pipes 48 and 34, back to the pump, whereby the iron in the retort 38 will be reduced by the $H_2$ and CO in the nitrogen gas. It will be understood that in the continued operation of the apparatus, the charcoal in retort 44 will be used up and must be replaced. However, the iron chips 42 in the retort 38 will last indefinitely since the gas containing $H_2$ and CO, which is recirculated through the retort 38 after passing through the furnace, will tend to restore the iron chips to their elemental condition.

Although a specific embodiment of the invention has been described hereinbefore, it will be understood that modifications thereof may be made without departing from the invention, which is to be limited only by the scope of the appended claims.

What is claimed is:

1. A method of supplying nitrogen to an article treating apparatus which comprises passing air over heated iron particles, passing the gas thus prepared over heated carbonaceous material, and directing the gas from said material through the treating apparatus and back through the heated iron particles.

2. A method of maintaining a controlled atmosphere in a treating apparatus comprising drawing air from the treating apparatus and from the surrounding atmosphere, directing the air under pressure over heated iron particles to remove the oxygen from the air, directing the gas thus prepared through heated charcoal, and directing the gas from the heated charcoal to the treating apparatus.

3. The method of supplying nitrogen to an article treating apparatus which comprises directing air under pressure over heated iron particles to remove the oxygen from the air, forcing the gas thus prepared through a mass of heated charcoal to remove water from the gas and prepare relatively pure nitrogen, passing said relatively pure nitrogen through the treating apparatus and back over the iron particles, and inspirating a small amount of air for mixing with the relatively pure nitrogen to replace the relatively pure nitrogen lost by leakage in the treating apparatus before directing the gas from the treating apparatus to the heated iron particles.

4. The method of supplying nitrogen to an article treating apparatus which comprises directing air under pressure over heated iron particles to remove the oxygen from the air, forcing the gas thus prepared through a mass of heated charcoal to remove water from the gas and prepare relatively pure nitrogen, passing said relatively pure nitrogen through the treating apparatus and back over the iron particles, inspirating a small amount of air for mixing with the relatively pure nitrogen to replace the relatively pure nitrogen lost by leakage in the treating apparatus before directing the gas from the treating apparatus to the heated iron particles, and restricting the flow of gas to the heated iron particles, thereby to maintain the gas in the treating apparatus under pressure.

GORDON J. MAXSON.

(References on following page)

REFERENCES CITED

The following references are of record in the file of this patent:

UNITED STATES PATENTS

| Number | Name | Date |
|---|---|---|
| 1,572,600 | Grafton | Feb. 9, 1926 |
| 1,712,251 | Chopra et al. | May 7, 1929 |
| 1,968,442 | Clark et al. | July 31, 1934 |
| 2,083,433 | Croft et al. | June 8, 1937 |
| 2,085,586 | Hotchkiss | June 29, 1937 |
| 2,085,597 | Marshall | June 29, 1937 |
| 2,152,154 | Robiette | Mar. 28, 1939 |
| 2,191,133 | Pearson | Feb. 20, 1940 |
| 2,278,204 | Lewis | Mar. 31, 1942 |
| 2,296,434 | Ghelardi et al. | Sept. 22, 1942 |

FOREIGN PATENTS

| Number | Country | Date |
|---|---|---|
| 16,963 | Great Britain | Feb. 11, 1909 |
| 484,569 | Great Britain | May 3, 1938 |